United States Patent [19]

Bhagavatula

[11] Patent Number: 5,768,450

[45] Date of Patent: Jun. 16, 1998

[54] WAVELENGTH MULTIPLEXER/ DEMULTIPLEXER WITH VARIED PROPAGATION CONSTANT

[75] Inventor: Venkata A. Bhagavatula, Big Flats, N.Y.

[73] Assignee: Corning Incorporated, Corning, N.Y.

[21] Appl. No.: 586,134

[22] Filed: Jan. 11, 1996

[51] Int. Cl.$^6$ .................................................. G02B 6/28
[52] U.S. Cl. ............................... 385/24; 385/28; 385/31; 385/33; 385/47; 359/127
[58] Field of Search .................... 385/24, 27, 28, 385/30, 31, 33, 42, 45, 46, 47, 48; 359/127

[56] References Cited

U.S. PATENT DOCUMENTS

| | | | |
|---|---|---|---|
| 3,937,557 | 2/1976 | Milton | 385/46 |
| 4,329,071 | 5/1982 | Kapany et al. | 350/96.15 |
| 4,472,797 | 9/1984 | Nicia | 370/1 |
| 4,479,697 | 10/1984 | Kapany et al. | 350/96.18 |
| 4,484,795 | 11/1984 | Bryon | 350/96.19 |
| 4,486,071 | 12/1984 | Levinson | 350/96.18 |
| 4,550,975 | 11/1985 | Levinson et al. | 350/96.18 |
| 4,675,860 | 6/1987 | Laude et al. | 370/3 |
| 4,714,313 | 12/1987 | Kapany et al. | 350/96.16 |
| 4,715,027 | 12/1987 | Mahapatra et al. | 370/3 |
| 4,718,055 | 1/1988 | Winzer | 370/3 |
| 4,723,829 | 2/1988 | Koonen | 350/96.19 |
| 4,741,588 | 5/1988 | Nicia et al. | 350/96.19 |
| 4,748,614 | 5/1988 | Dammann et al. | 370/3 |
| 4,749,247 | 6/1988 | Large | 350/96.16 |
| 4,763,969 | 8/1988 | Khoe et al. | 350/96.19 |
| 4,773,063 | 9/1988 | Hunsperger et al. | 370/3 |
| 4,786,133 | 11/1988 | Gidon et al. | 350/96.19 |
| 4,800,557 | 1/1989 | Weber | 370/3 |
| 4,819,224 | 4/1989 | Laude | 370/3 |
| 4,836,634 | 6/1989 | Laude | 350/96.19 |
| 4,838,638 | 6/1989 | Kamiyuama et al. | 350/96.19 |
| 4,923,271 | 5/1990 | Henry et al. | 350/96.19 |
| 4,938,553 | 7/1990 | Maerz et al. | 350/96.11 |
| 5,002,350 | 3/1991 | Dragone | 350/96.15 |
| 5,016,967 | 5/1991 | Meltz et al. | 350/96.19 |
| 5,026,131 | 6/1991 | Jannson et al. | 350/3.7 |
| 5,140,657 | 8/1992 | Thylen | 385/37 |
| 5,175,780 | 12/1992 | Sano et al. | 385/47 |

(List continued on next page.)

OTHER PUBLICATIONS

C. Dragone, et al. "Integrated Optics N X N Multiplexer on silicon," IEEE Photonics Technology Letters, vol. 3, No. 10, Oct. 1991, pp. 896–899.

BM Desthieux et al. "Accurate measurement of EDFA gain excursion for dense WDM applications", OFC'95 Technical Digest, Tuesday Afternoon, p. 81 no month.

Soole, et al. "Spectrometer on chip: a monolithic WDM component", OFC '92 Technical Digest, Wednesday Afternoon, p. 123 no month.

PE Green, Jr., et al. "All-Optical Packet-Switched Metropolitan-Area Network Proposal", Journal of Lightwave Technology, vol. 11, No. 5/6, May/Jun. 1993, pp. 754–763.

SB Alexander, et al. "A Precompetitive Consortium on Wide-Band All-Optical Networks", Journal of Lightwave Technology, vol. 11, No. 5/6, May/Jun. 1993, pp. 714–735.

Electronics Letters, 16th July 1987, vol. 23, No. 15, pp. 781–783.

M. Sirasaki, "Large Angular-Dispersion by Virtually-Imaged Phased-Array (VIPA) and its Application to Wavelength Demultiplexing", MOC '95 Hiroshima, pp. 10–13 no month.

Applied Optics, vol. 10, No. 10, Oct. 1971, "Approximate Analytic Solution".

*Primary Examiner*—Phan T. H. Palmer
*Attorney, Agent, or Firm*—Edward F. Murphy

[57] ABSTRACT

Wavelength dispersion in an optical demultiplexer is accomplished by varying propagation constants of a central pathway traverse to the direction of wavefront propagation through the central pathway. The propagation constant can be varied by changing the dimensions or refractive qualities of the central pathway, which can be formed as a common waveguide or as a plurality of individual waveguides.

60 Claims, 3 Drawing Sheets

U.S. PATENT DOCUMENTS

| | | | |
|---|---|---|---|
| 5,218,654 | 6/1993 | Sauter | 385/24 |
| 5,228,103 | 7/1993 | Chen et al. | 385/14 |
| 5,233,187 | 8/1993 | Sakata et al. | 250/227.24 |
| 5,245,404 | 9/1993 | Jannson et al. | 356/301 |
| 5,245,680 | 9/1993 | Sauter | 385/24 |
| 5,317,655 | 5/1994 | Pan | 385/11 |
| 5,361,155 | 11/1994 | Chiaroni et al. | 359/131 |
| 5,371,816 | 12/1994 | Pan | 385/33 |
| 5,377,286 | 12/1994 | Iida et al. | 385/33 |
| 5,420,948 | 5/1995 | Byron | 385/37 |
| 5,450,511 | 9/1995 | Dragone | 385/37 |
| 5,636,300 | 6/1997 | Keck et al. | 385/24 |

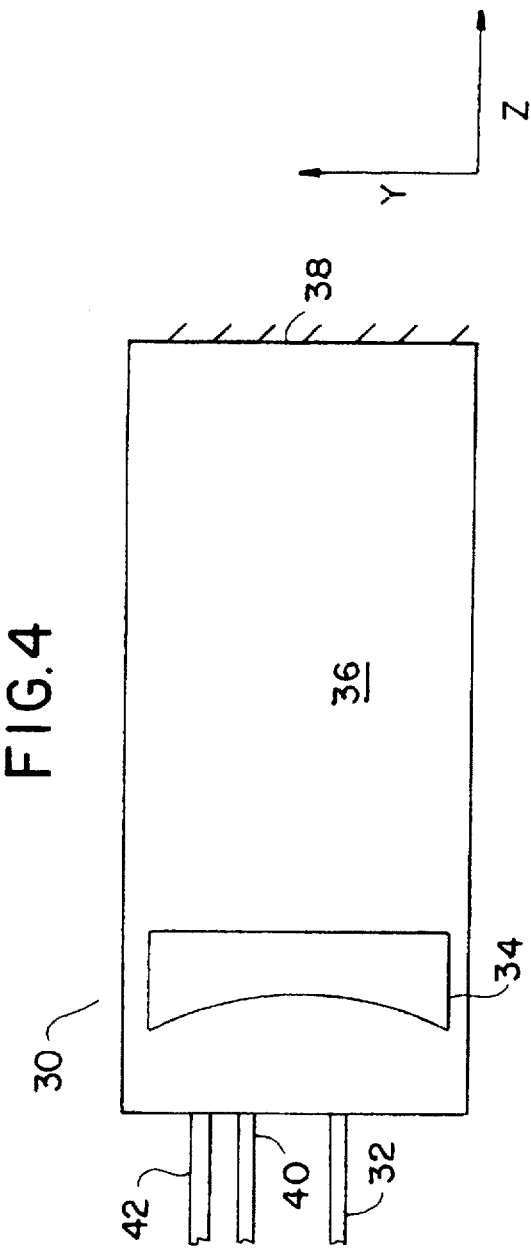
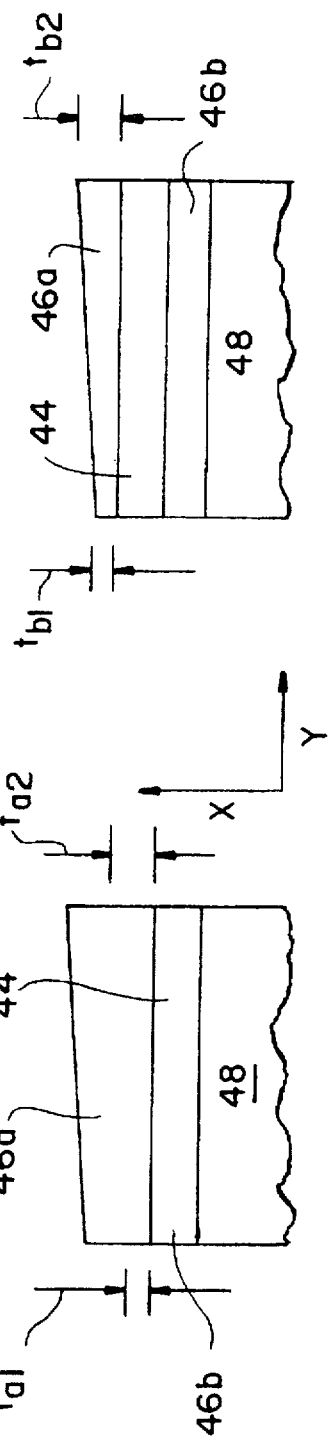

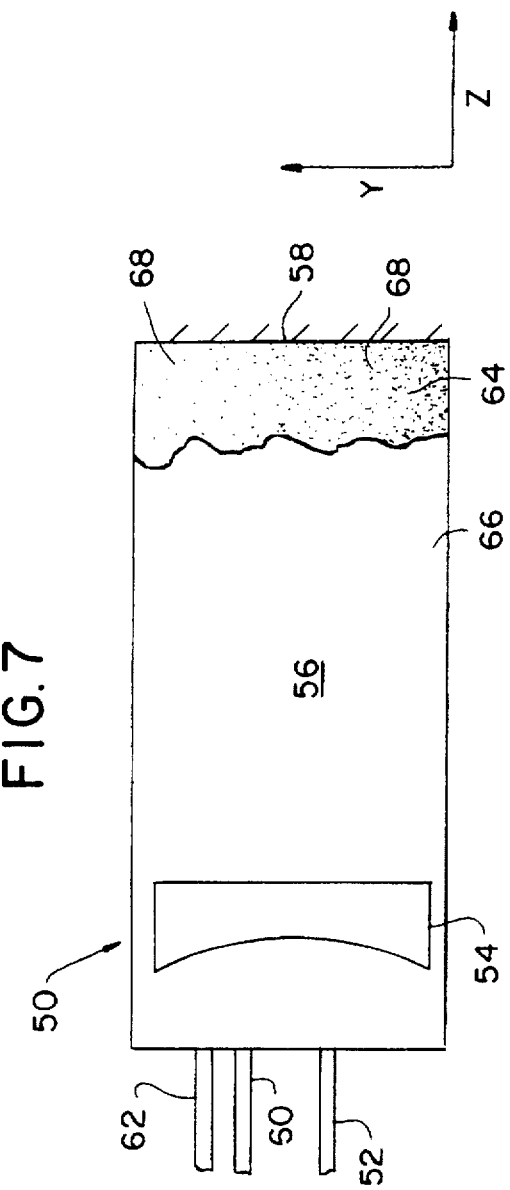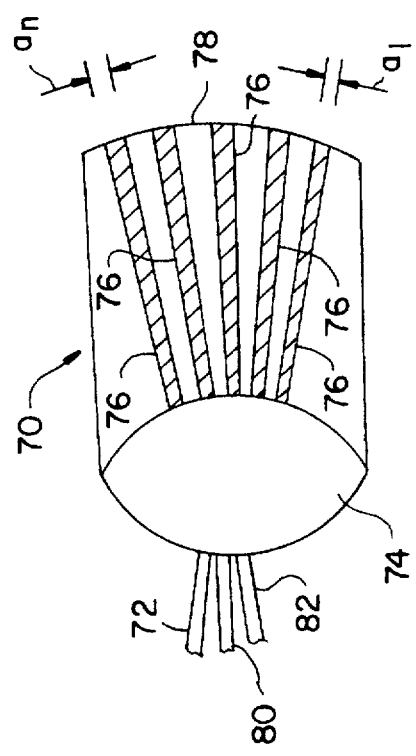

5,768,450

WAVELENGTH MULTIPLEXER/ DEMULTIPLEXER WITH VARIED PROPAGATION CONSTANT

TECHNICAL FIELD

The invention relates to optical communication systems including multiplexers and demultiplexers that route optical signals according to their wavelength.

BACKGROUND

Optical signals of different wavelengths traveling in separate optical fibers can be routed into a single optical fiber by a wavelength multiplexer and later rerouted into separate optical fibers by a wavelength demultiplexer. Generally, the devices used in multiplexing and demultiplexing operations must be reversible so the same devices function as multiplexers in one direction of travel and as demultiplexers in the opposite direction of travel.

Within the multiplexing and demultiplexing devices, two main functions are performed, namely, dispersing and focusing. The dispersing function spatially distinguishes the different wavelength signals, referred to as channels; and the focusing function routes the signals between input and output waveguides according to their dispersion.

Often, the same optical components perform both functions. For example, some multiplexing and demultiplexing devices use reflective diffraction gratings to both disperse and focus the signals. Diffraction is the mechanism of dispersion, and grating curvature provides the focus. Other such devices referred to as "phasors" interconnect input and output waveguides with a plurality of central waveguides that vary progressively in length. The progressive variation in waveguide length produces phase front tilt as a function of wavelength. An angular arrangement of the central waveguides provides the focus.

Alternatively, separate lenses or mirrors can be used to provide the focusing function. Relieved of this additional requirement, the dispersing components can be simplified. For example, flat diffraction gratings can be used in place of curved diffraction gratings, or parallel central waveguides can be used in place of angularly arrayed central waveguides.

As design criteria become more stringent, such as requiring more closely spaced channels with minimum loss, lower cost, and smaller size, the current designs of multiplexers and demultiplexers become increasingly difficult and expensive to manufacture. High accuracy diffraction gratings are particularly expensive, and the amount of etching required by phasors is particularly time consuming.

Ordinarily, care must be taken to avoid compositional variations in materials and other dimensional variations that could produce unwanted changes in the propagational characteristics of the waveguides. For example, U.S. Pat. No. 5,450,511 to Dragone teaches that changes in the propagation constant can cause phase errors in the optical signals conveyed by multiplexing and demultiplexing devices resulting in increased cross-talk between channels and reduced efficiency of the devices.

SUMMARY OF INVENTION

Contrary to the teaching that changes in the propagation constant are to be avoided, my invention uses a progressive change in propagation constant to provide the dispersive function in wavelength multiplexers and demultiplexers. This new mechanism for accomplishing wavelength dispersion can be used to reduce the physical size and simplify the fabrication of these devices.

An embodiment of my invention includes the usual features of input and output optical pathways interconnected by dispersing and focusing elements. As a demultiplexer, the input optical pathway conveys a plurality of channels distinguished by wavelength, and the output optical pathways separately convey the channels. The dispersing element is a central optical pathway that receives the plurality of channels from the input optical pathway as a plurality of parallel wavefronts and transforms the plurality of parallel wavefronts into a plurality of relatively inclined wavefronts. The focusing element directs the relatively inclined wavefronts along the different output optical pathways. However, instead of relatively inclining the wavefronts by diffraction or variable length waveguides, the central pathway of my invention exhibits different propagation constants for a given wavelength across the central waveguide in a direction transverse to the direction of wavefront propagation through the central waveguide.

The propagation constants can be changed in various ways. These include changing core dimensions of the central waveguide, as well as changing the index values of the core and cladding. The index profile of the core also figures in the propagation constant of non-step index profiles. For example, the index profile can be selected to increase the rate of change of the propagation constant for a given change in core dimension or peak refractive indices.

The central pathway can be composed of either a plurality of individual waveguides (or optical fibers) or a common waveguide. Both include core portions surrounded by cladding. Core portions of the individual waveguides can be varied in width, thickness, and cross-sectional shape; and the core portion of the common waveguide can be varied in thickness. The overcladding can also be varied in thickness. Doping or other material variations can be used to change the index values of the core and cladding between the individual waveguides or across the common waveguide.

Preferably, a reflective optic is positioned at one end of the central pathway to provide a more compact design. The relatively inclined wavefronts of the different wavelengths are further relatively inclined within the same space of the central pathway by retroreflection through the central pathway. The input and output pathways are adjacent to each other. The focusing element preferably performs a collimating function for directing different portions of the wavefronts along parallel optical pathways. The reflective optic for retroreflecting the wavefronts along the parallel optical pathways is flat, and the individual waveguides of the central pathway are parallel to each other. However, the parallel pathways can also extend through the common waveguide without any lateral divisions, because the light remains collimated in the direction of propagation.

The optical pathways and the dispersing and focusing elements are preferably formed as an integrated optical circuit in planar optics. The relatively simple design of the elements allows for the use of fabrication techniques such as "redraw", where more exact tolerances can be obtained by stretching planar substrates to control thickness. However, the invention could also be implemented in bulk optics or in a combination of planar and bulk optics.

DRAWINGS

FIG. 4 is a plan view of a second demultiplexing device having a common waveguide for dispersing different wavelength signals.

FIG. 5 is a cross-sectional end view of the common waveguide showing a tapered core layer.

FIG. 6 is a cross-sectional end view of the common waveguide showing a tapered cladding layer.

FIG. 7 is a plan view of a third demultiplexing device having a common waveguide with varying concentrations of dopant for dispersing different wavelength signals.

FIG. 8 is a plan view of a fourth demultiplexing device having a plurality of radial waveguides for dispersing different wavelength signals.

DETAILED DESCRIPTION

Figure 1:
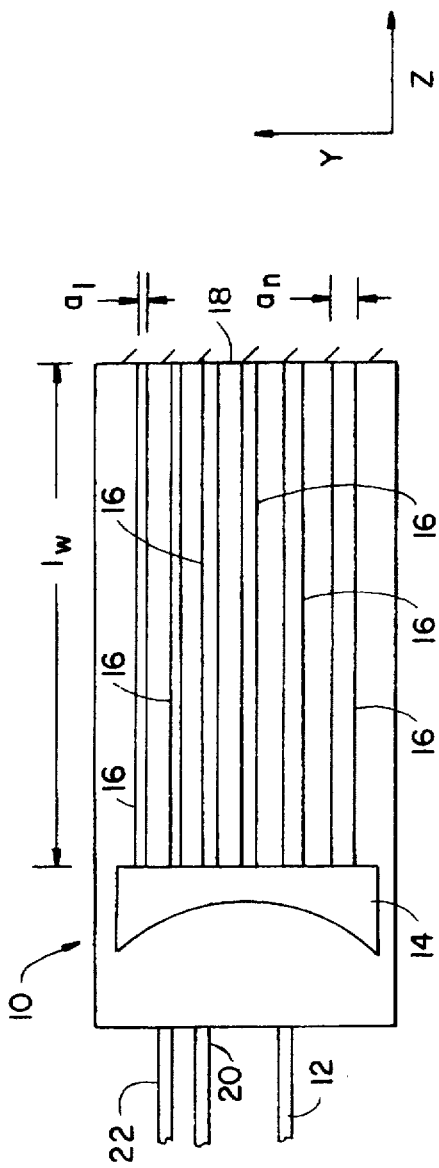
FIG. 1 is a plan view of a new demultiplexing optic in planar form having a plurality of parallel waveguides for dispersing different wavelength signals.
Figure 3:
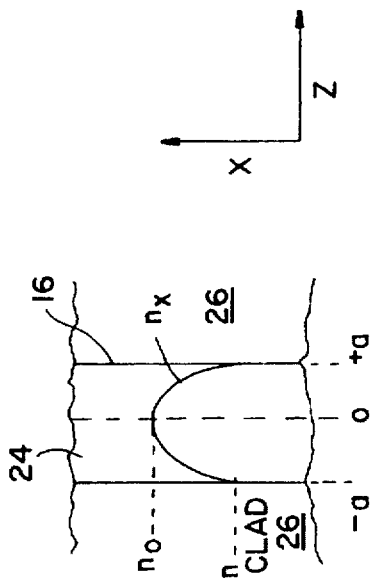
FIG. 3 is a graph showing an index profile superimposed on a section of waveguide.
Figure 2:
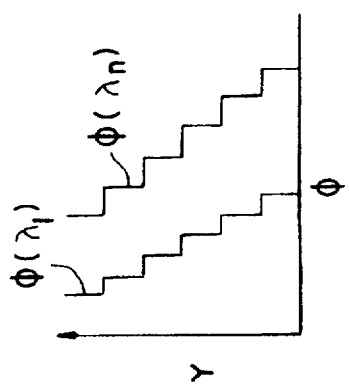
FIG. 2 is a graph showing phase front tilt to two different wavelengths measured across a central passageway of the optic.

Illustrated by drawing FIGS. 1–3 is a first embodiment of my invention implemented in planar optics. The embodiment is described with respect to a direction of light travel for a demultiplexer but could function equally well in the opposite direction of light travel as a multiplexer. In fact, the terms "multiplexer" and "demultiplexer" are used only for the purpose of referencing the embodiment to one of these possible functions but do not exclude the other.

Optical signals of differing wavelengths (i.e., $\lambda_1$ through $\lambda_n$) enter a planar demultiplexing optic 10 from an input waveguide (or optical fiber) 12 and diverge to fill the aperture of a focusing optic (collimating lens) 14. The diverging wavefronts are collimated by the focusing optic 14. Discrete portions of the wavefronts propagate through a plurality of parallel waveguides 16 to a flat reflective optic 18, which retroreflects the wavefronts on a return path to the focusing optic 14. The input waveguide 12 is preferably located along an optical axis of the focusing optic 14, but similar principles also apply for off-axis arrangements.

The parallel waveguides 16, which form a central pathway through the planar optic 10, share a common length "$l_w$" in a direction "Z" of wavefront propagation but progressively vary in width from "$a_1$" to "$a_n$" along orthogonally related direction "Y". The change in waveguide width from "$a_1$" to "$a_n$" indirectly varies optical path lengths "$L_i$" of the different waveguides 16 by changing an effective refractive index "$n_{eff}$" according to the following relationship:

$$L_i = n_{eff} \cdot l_w$$

The change in optical path lengths "$L_i$" evaluated at the reflective optic 18 relatively inclines the wavefronts according to their wavelengths $\lambda_1$–$\lambda_n$ as shown in the graph of FIG. 2. The graph ordinate spans the waveguides 16 in the direction "Y" at a position coincident with the reflective optic 18. The graph abscissa is in units of phase angle "$\phi$". The stepped line $\phi(\lambda_1)$ represents a collection of the phase angles "$\phi$" in the waveguides 16 for the wavelength $\lambda_1$. The stepped line $\phi(\lambda_n)$ represents a collection of the phase angles "$\phi$" in the waveguides 16 for the wavelength $\lambda_n$. The angular difference between the two stepped lines $\phi(\lambda_1)$ and $\phi(\lambda_n)$ represents a difference in phase front tilt between the two wavelengths $\lambda_1$ and $\lambda_n$.

The phase front tilt changes the focus of the returning wavefronts from coincidence with the input waveguide 12 (the expected focus of retroreflected wavefronts that are not tilted) to output waveguides 20 and 22 according to the respective amounts of tilt. For example, the wavelength $\lambda_1$ focuses on the closer output waveguide 20 and the wavelength $\lambda_n$ focuses on the more distant output waveguide 22. Of course, more wavelengths $\lambda$ between the wavelengths $\lambda_1$ and $\lambda_n$, representing additional signals (or channels), could be focused on additional output waveguides positioned between the waveguides 20 and 22. The number of waveguides 16 could be increased to more accurately image the mode field of the input waveguide 12 on each of the output waveguides 20 and 22.

The effective index "$n_{eff}$" of the respective waveguides is a quotient of propagation constant "$\beta$" and wave number "$k_0$" as follows:

$$n_{eff} = \frac{\beta}{k_0}$$

where the wave number "$k_0$" can be expressed in terms of wavelength as follows:

$$k_0 = \frac{2\pi}{\lambda}$$

The propagation constant "$\beta$" can be calculated from a wave equation using well-known techniques. An example of a wave equation for a planar optical waveguide found in a reference by J. P. Meunier et al., Optical and Quantum Electronics 15, (1983) 77–85, is as follows:

$$\left[ \frac{d}{dx^2} + k_0^2 n^2(x) \right] \phi_m(x) = \beta_m^2 \phi_m(x)$$

where the term "$\phi_m(x)$" is a field distribution of the mode and "$n(x)$" is the index profile of the core. The index profile "$n(x)$", which is shown in the cross-sectional view of FIG. 3, depends on the profile shape, core dimension "a", and the peak index values "$n_0$" of core 24 and "$n_{clad}$" of cladding 26. The latter peak index values "$n_0$" and "$n_{clad}$" are often considered together as the variable "$\Delta$", which is defined as follows:

$$\Delta \cong \frac{n_0 - n_{clad}}{n_0}$$

Any of these variables that affect the index profile "$n(x)$" of the respective waveguides 16 also can be used to change the propagation constant "$\beta$", which in turn changes the effective index "$n_{eff}$" and the resulting optical path length "$L_i$" of the waveguides 16. The progressive variation in optical path length "$L_i$" of the waveguides 16 in the "Y" direction produces the different wavefront tilts of the wavelength $\lambda_1$ and $\lambda_n$, causing them to focus in the different positions occupied by the output waveguides 20 and 22.

Preferably, the profile shape of non-step index waveguide profiles is adjusted so that changes in the waveguide dimensions, e.g., "a", or changes in the peak indices, e.g., "$\Delta$", produce larger changes in the propagation constant "$\beta$". This limits the amount of required physical change between the different waveguides 16. Also, the waveguides are preferably single mode to better control differences between their optical path lengths "$L_i$".

Two versions of a second embodiment of my invention are illustrated in FIGS. 4–6. A new planar demultiplexing optic 30 includes several of the same components as the planar optic 10 including input waveguide 32, collimating optic 34, reflecting optic 38, and output waveguides 40 and 42. However, the plurality of individual waveguides 16 are replaced by a common waveguide 36. Instead of varying respective width dimensions "$a_1$" through "$a_n$" of individual waveguides, a thickness dimension "t" of the common waveguide 36, which is measured in a direction "X", is varied in the same "Y" direction transverse to the direction "Z" of wavefront propagation.

The common waveguide 36 is formed by a continuous layer 44 of core material located between continuous layers 46a and 46b of cladding material on a planar substrate 48. In one version of this embodiment, illustrated by FIG. 5, the core layer 44 continuously varies in thickness from "$t_{a1}$" to "$t_{a2}$" across the common waveguide 36. In the other version, illustrated by FIG. 6, the cladding layer 46a varies in thickness from "$t_{b1}$" to "$t_{b2}$" across the common waveguide 36.

Both thickness variations result in a continuous change of the propagation constant "$\beta$" in the "Y" direction across the waveguide. The collimating optic 34 limits any movement of the propagating wavefronts in the "Y" direction, so individual waveguides are not required to separate the propagating wavefronts into separate paths having different optical path lengths "$L_i$". The continuous variation of the propagation constant "$\beta$" is expected to more accurately project the mode field of the input waveguide 32 on each of the output waveguides 40 and 42.

The planar multiplexing optics 10 and 30 are particularly suitable for simplified manufacture by "redraw" in which layers of core 44 and cladding 46a and 46b are deposited on the substrate 48 with additional thickness and are stretched together with the substrate to exact dimensions. The process permits much wider tolerances for deposition. Alternatively, grinding or polishing could be used to control waveguide thickness.

A third embodiment of my invention, illustrated in FIG. 7, includes several features in common with the second embodiment. A planar demultiplexing optic 50 includes an input waveguide 52, a focusing optic (collimating lens) 54, a common waveguide 56, a flat reflective optic 58, and output waveguides 60 and 62. In contrast to the second embodiment, the propagation constant "$\beta$" is varied by a change of refractive index across the common waveguide 56. For example, either or both of the peak refractive indices of the core 64 and cladding 66 can be changed, such as by adding varying concentrations of dopant 68. The result, however, is similar to the second embodiment, namely, a continuous variation in the optical path length in the "Y" direction.

The change in refractive index can be made in several ways including using a thin film approach such as OVD (outside vapor deposition) and PECVD (plasma-enhanced chemical vapor deposition). The varying concentrations of dopant 68 could also be achieved using ion exchange techniques.

A fourth and final embodiment shown in FIG. 8 is formed as a planar demultiplexing optic 70 including an input waveguide 72 and a focusing optic 74, which has zero power but provides a free-space region for converging or diverging wavefronts. A periodic array of radial waveguides 76, which form a central pathway through the optic 70, terminate at a curved reflective optic 78. Each radial waveguide 76 conveys a separate portion of a respective cylindrical wavefront corresponding to one of the wavelengths "$\lambda_1$" through "$\lambda_n$". The curved reflective optic 78 retroreflects the cylindrical wavefronts on a converging path through the radial waveguides 76 to the free-space of the focusing optic 74.

However, similar to the first embodiment, the radial waveguides 76 progressively vary in width from "$a_1$" to "$a_n$" for changing the propagation constant "$\beta$" of different portions of the cylindrical wavefronts. Although the wavefronts of the different wavelengths "$\lambda_1$" through "$\lambda_n$" propagate cylindrically, the change in propagation constant "$\beta$" remains transverse to the instant directions of wavefront propagation along the radial waveguides 76. The resulting change in the optical path lengths "$L_i$" of the radial waveguides 76 relatively inclines the cylindrical wavefronts of the different wavelengths "$\lambda_1$" through "$\lambda_n$", causing them to converge to slightly different focus positions at output waveguides 80 and 82.

Although the above-described embodiments of my invention are implemented in planar optics, bulk or hybrid implementations are also possible. For example, optical fibers could be substituted for the parallel waveguides 16 of optic 10 or the radial waveguides 76 of optic 70. The various means for changing propagation constants disclosed in any one of the embodiments could also be applied to other of the embodiments. For example, the individual waveguides of FIGS. 1 and 8 could also be varied in thickness or in various refractive qualities. Combinations of the various means for changing the propagation constant, as well as transverse variations in the length "$l_w$", could be used for further tuning the input and output mode fields.

The waveguides in the illustrated embodiments have been depicted as buried waveguides, but other known types of waveguides including rib waveguides could also be used. Similarly, the focusing optic, which has been depicted as a lens, could also be arranged together with the input or output waveguides as a mirror, such as a collimating mirror or similar reflective surface. The input and output waveguides of the various embodiments could also be arrayed in various combinations including equal numbers of input and output waveguides.

I claim:

1. A waveguide device for multiplexing or demultiplexing optical signals, as referenced in a direction for performing demultiplexing operations, comprising:

a first optical pathway that conveys a plurality of channels distinguished by wavelength;

a central optical pathway that is optically coupled to said first optical pathway and that receives the plurality of channels as a plurality of parallel wavefronts and transforms the plurality of parallel wavefronts into a plurality of relatively inclined wavefronts; and a focusing optic that is optically coupled to said central optical pathway and that conveys the relatively inclined wavefronts to respective second optical pathways, wherein said central pathway exhibits different propagation constants for a given wavelength across said central optical pathway in a direction transverse to a direction of propagation of the plurality of wavefronts through said central waveguide for relatively inclining the wavefronts of different wavelength.

2. The device of claim 1 in which said central pathway includes a common waveguide formed by continuous layers of core and cladding on a substrate surface and having a length that extends parallel to both the direction of wavefront propagation and the substrate surface, a width that extends perpendicular to the direction of propagation but parallel to the substrate surface, and a thickness that extends perpendicular to both the direction of wavefront propagation and the substrate surface.

3. The device of claim 2 in which one of said layers of core and cladding has a refractive index that varies across the width of the common waveguide.

4. The device of claim 3 in which said core layer has a refractive index that progressively varies across the width of the common waveguide.

5. The device of claim 3 in which said cladding layer has a refractive index that progressively varies across the width of the common waveguide.

6. The device of claim 3 in which the refractive indices of said core and cladding remain constant along the length of the common waveguide.

7. The device of claim 2 in which one of said layers of core and cladding varies in thickness across the width of the common waveguide.

8. The device of claim 7 in which said core layer progressively varies in thickness across the width of the common waveguide.

9. The device of claim 7 in which said cladding layer progressively varies in thickness across the width of the common waveguide.

10. The device of claim 7 in which said layers of core and cladding remain of constant thickness along the length of the common waveguide.

11. The device of claim 1 in which said central pathway includes a plurality of waveguides having respective lengths that extend in the direction of wavefront propagation and respective widths that extend in a direction transverse to the direction of wavefront propagation.

12. The device of claim 11 in which said plurality of waveguides progressively vary in width one from another in a direction transverse to the direction of wavefront propagation.

13. The device of claim 12 in which said plurality of waveguides are angularly related for conveying different portions of cylindrical wavefronts.

14. The device of claim 13 in which said reflective optic returns relatively inclined cylindrical wavefronts through said central pathway on route to said focusing optic, which has zero optical power.

15. The device of claim 12 in which said plurality of waveguides are equal in length.

16. The device of claim 12 in which said focusing optic directs different portions of the wavefronts along parallel optical pathways and said plurality of waveguides extend parallel to each other for conveying the different portions of the wavefronts.

17. The device of claim 1 further comprising a reflective optic that reflects the relatively inclined wavefronts back through said central pathway to said focusing optic.

18. The device of claim 17 in which said reflective optic is oriented for retroreflecting the relatively inclined wavefronts.

19. The device of claim 17 in which said focusing optic directs different portions of the wavefronts from said first optical pathway along parallel optical pathways.

20. Apparatus for routing optical signals according to their wavelength comprising:

a single optical pathway that conveys a plurality of optical signals distinguished by their wavelength;

a plurality of optical pathways that separately convey the different wavelength signals; and a central optical pathway that relatively disperses the different wavelength signals for transmitting the different wavelength signals between the single optical pathway and the plurality of optical pathways, wherein the central optical pathway exhibits different propagation constants in a direction transverse to a direction of propagation through the central pathway for relatively dispersing the different wavelength signals.

21. The apparatus of claim 20 in which the central optical pathway has refractive qualities that vary in the transverse direction.

22. The apparatus of claim 21 in which the central optical pathway is formed by layers of core and cladding material and a refractive index of the layer of core material varies in the transverse direction.

23. The apparatus of claim 21 in which the central optical pathway is formed by layers of core and cladding material and a refractive index of the layer of cladding material varies in the transverse direction.

24. The apparatus of claim 21 in which the central optical pathway is formed by layers of core and cladding material and the layer of core material exhibits a non-step index profile that increases differences between the propagation constants with respect to a step index profile.

25. The apparatus of claim 20 in which the central optical pathway is formed as a planar optic having a thickness that varies in the transverse direction.

26. The apparatus of claim 25 in which the central optical pathway is formed by layers of core and cladding material deposited on a substrate and the layer of core material varies in thickness in the transverse direction.

27. The apparatus of claim 25 in which the central optical pathway is formed by layers of core and cladding material deposited on a substrate and the layer of cladding material varies in thickness in the transverse direction.

28. The apparatus of claim 20 further comprising a focusing element that directs different portions of the wavelength signals along parallel optical pathways.

29. The apparatus of claim 28 in which the parallel optical pathways differ from each other in dimension for exhibiting the different propagation constants.

30. The apparatus of claim 28 in which the parallel optical pathways differ from each other in refractive qualities for exhibiting the different propagation constants.

31. The apparatus of claim 20 in which the central optical pathway is formed by a plurality of waveguides exhibiting the different propagation constants.

32. The apparatus of claim 31 in which the plurality of waveguides vary from each other in a dimension measured transverse to the direction of propagation through the central pathway.

33. The apparatus of claim 31 in which the plurality of waveguides vary from each other in refractive qualities.

34. A method of dispersing different wavelength signals in a wavelength multiplexer/demultiplexer comprising the steps of:

receiving a plurality of different wavelength signals as a plurality of wavefronts;

directing different portions of the wavefronts along separate optical pathways exhibiting respective propagation constants; and varying the propagation constants between the separate optical pathways for relatively inclining the wavefronts according to their wavelength.

35. The method of claim 34 in which said step of directing includes conveying the different portions of the wavefronts along a plurality of waveguides.

36. The method of claim 35 in which said step of directing includes conveying the different portions of the wavefronts along a plurality of parallel waveguides.

37. The method of claim 35 in which said step of directing includes conveying the different portions of the wavefronts along a plurality of radial waveguides.

38. The method of claim 35 in which said step of varying includes varying individual dimensions of the waveguides measured transverse to a direction of propagation through the waveguides.

39. The method of claim 34 in which said step of directing includes conveying the different portions of the wavefronts along a common waveguide.

40. The method of claim 39 in which said step of directing includes directing the different portions of the wavefronts along parallel pathways.

41. The method of claim 40 in which said step of varying includes varying a dimension of the common waveguide in a direction transverse to a direction of propagation through the common waveguide.

42. The method of claim 40 in which said step of varying includes varying a refractive quality of the common waveguide in a direction transverse to a direction of propagation through the common waveguide.

43. The method of claim 34 including the further step of forming the separate optical pathways with core and cladding materials exhibiting a non-step index profile that with respect to a step index profile increases differences between the propagation constants of the separate optical pathways.

44. A waveguide device for multiplexing or demultiplexing optical signals, as referenced in a direction for performing demultiplexing operations, comprising:

a first optical pathway that conveys a plurality of channels distinguished by wavelength;

a central optical pathway that is optically coupled to said first optical pathway and that receives the plurality of channels as a plurality of parallel wavefronts and transforms the plurality of parallel wavefronts into a plurality of relatively inclined wavefronts;

in which said central pathway includes a common waveguide formed by continuous layers of core and cladding on a substrate surface and having a length that extends parallel to both the direction of wavefront propagation and the substrate surface, a width that extends perpendicular to the direction of propagation but parallel to the substrate surface, and a thickness that extends perpendicular to both the direction of wavefront propagation and the substrate surface.

45. The device of claim 44 in which one of said layers of core and cladding varies in thickness across the width of the common waveguide.

46. The device of claim 45 in which said core layer progressively varies in thickness across the width of the common waveguide.

47. The device of claim 45 in which said cladding layer progressively varies in thickness across the width of the common waveguide.

48. The device of claim 45 in which said layers of core and cladding remain of constant thickness along the length of the common waveguide.

49. The device of claim 44 in which one of said layers of core and cladding has a refractive index that varies across the width of the common waveguide.

50. The device of claim 49 in which said core layer has a refractive index that progressively varies across the width of the common waveguide.

51. The device of claim 49 in which said cladding layer has a refractive index that progressively varies across the width of the common waveguide.

52. The device of claim 49 in which the refractive indices of said core and cladding remain constant along the length of the common waveguide.

53. Apparatus for routing optical signals according to their wavelength comprising:

at least one first optical pathway that conveys a plurality of optical signals distinguished by their wavelength;

a plurality of second optical pathways that separately convey the different wavelength signals; and a plurality of individual waveguides of equal length that relatively disperse the different wavelength signals for transmitting the different wavelength signals between the at least one first optical pathway and the plurality of second optical pathways.

54. The apparatus of claim 53, where in a direction traverse to the length of said individual waveguides said individual waveguides have a different propagation constant.

55. The apparatus of claim 53, wherein said apparatus comprises a reflective multiplexer/demultiplexer.

56. Apparatus for routing optical signals according to their wavelength comprising:

at least one first optical pathway that conveys a plurality of optical signals distinguished by their wavelength;

a plurality of second optical pathways that separately convey the different wavelength signals; and a common waveguide that relatively disperses the different wavelength signals for transmitting the different wavelength signals between the at least one first optical pathway and the plurality of second optical pathways.

57. An optical wavelength multiplexer/demultiplexer for routing a plurality of different wavelength channels into a plurality of particular individual wavelength channels as referenced in a direction for demultiplexing operations comprised of a first optical pathway that inputs the plurality of different wavelength channels, a plurality of second optical pathways that each individually output one of the particular individual wavelength channels, and a plurality of waveguides of equal length that disperse the plurality of different wavelength channels into the particular individual wavelength channels.

58. The optical wavelength multiplexer/demultiplexer of claim 57, further comprising a reflective optic.

59. An optical wavelength multiplexer/demultiplexer for routing a plurality of different wavelength channels into a plurality of particular individual wavelength channels as referenced in a direction for demultiplexing operations comprised of a first optical pathway that inputs the plurality of different wavelength channels, a plurality of second optical pathways that each individually output one of the particular individual wavelength channels, and a common waveguide that disperses the plurality of different wavelength channels into the particular individual wavelength channels.

60. The optical wavelength multiplexer/demultiplexer of claim 59, further comprising a reflective optic.

* * * * *